US012750465B1

(12) United States Patent
Nevison

(10) Patent No.: US 12,750,465 B1
(45) Date of Patent: Sep. 29, 2026

(54) SECURITY DEVICE FOR USE WITH A MAILBOX

(71) Applicant: Martin A Nevison, Fort Worth, TX (US)

(72) Inventor: Martin A Nevison, Fort Worth, TX (US)

( * ) Notice: Subject to any disclaimer, the term of this patent is extended or adjusted under 35 U.S.C. 154(b) by 185 days.

(21) Appl. No.: 18/497,007

(22) Filed: Oct. 30, 2023

Related U.S. Application Data

(63) Continuation-in-part of application No. 17/208,927, filed on Mar. 22, 2021, now Pat. No. 11,812,878, which is a continuation-in-part of application No. 16/271,864, filed on Feb. 10, 2019, now Pat. No. 10,954,068.

(60) Provisional application No. 62/628,989, filed on Feb. 10, 2018.

(51) Int. Cl.

| | |
|---|---|
| ***H04N 7/18*** | (2006.01) |
| ***A47G 29/122*** | (2006.01) |
| ***A47G 29/30*** | (2006.01) |
| ***G06V 10/82*** | (2022.01) |
| ***G06V 20/52*** | (2022.01) |
| ***H04L 9/00*** | (2022.01) |
| ***H04N 23/66*** | (2023.01) |

(52) U.S. Cl.
CPC ........... *H04N 7/188* (2013.01); *A47G 29/122* (2013.01); *A47G 29/30* (2013.01); *G06V 10/82* (2022.01); *G06V 20/52* (2022.01); *H04L 9/50* (2022.05); *H04N 23/66* (2023.01)

(58) Field of Classification Search
CPC .... A47G 29/122; A47G 29/30; A47G 29/141; A47G 29/20; A47G 2029/149; H04N 7/188; H04N 23/66; G06V 10/82; G06V 20/52; H04L 9/50
See application file for complete search history.

(56) References Cited

U.S. PATENT DOCUMENTS

| | | | |
|---|---|---|---|
| 386,757 | A | 7/1888 | Regester |
| 2,428,509 | A | 10/1947 | Baker |
| 3,204,740 | A | 9/1965 | Jean |
| 3,279,685 | A | 10/1966 | Price |
| 3,615,050 | A | 10/1971 | Deaton et al. |
| 3,880,344 | A | 4/1975 | Earle |
| 5,772,112 | A | 6/1998 | Bulcroft |
| 5,774,053 | A | 6/1998 | Porter |
| 5,979,750 | A | 11/1999 | Kindell |
| 6,415,552 | B1 | 7/2002 | Khosropour |
| 6,484,531 | B1 | 11/2002 | Hambleton et al. |
| 6,719,195 | B2 | 4/2004 | Farentinos |
| 6,920,835 | B1 | 7/2005 | Johnson |

(Continued)

*Primary Examiner* — William L Miller
(74) *Attorney, Agent, or Firm* — AVEK IP, LLC

(57) ABSTRACT

A security device for installing on a mailbox includes a housing to mount to the mailbox via one or more attachment devices; a camera supported by the housing; a power system at least partially housed within the housing to provide power to the camera; and a processing system at least partially housed within the housing to operate the camera, the processing system including a processing unit to implement one or more actions, the one or more actions including a first action, the first action defined as an activation of the camera to begin recording within a pre-set geographic region of the mailbox; the first action is implemented based on one or more triggers.

17 Claims, 7 Drawing Sheets

(56) References Cited

U.S. PATENT DOCUMENTS

| | | | | |
|---|---|---|---|---|
| 6,967,575 | B1 | 11/2005 | Dohrmann et al. | |
| 7,175,070 | B1 | 2/2007 | Brisport et al. | |
| 7,256,691 | B2 | 8/2007 | Awobue | |
| 7,815,112 | B2 | 10/2010 | Volpe et al. | |
| 7,913,898 | B2 | 3/2011 | Frankenberg et al. | |
| 8,523,050 | B1 | 9/2013 | Andreozzi | |
| 9,211,025 | B1 | 12/2015 | Elhawwashy | |
| 10,016,083 | B1 * | 7/2018 | Atieh | H04L 63/00 |
| 10,314,424 | B2 | 6/2019 | Geng | |
| 10,389,983 | B1 * | 8/2019 | Fu | H04N 7/181 |
| 10,588,440 | B1 | 3/2020 | Kajgana | |
| 10,881,234 | B2 * | 1/2021 | Roberts | E05B 65/06 |
| 10,954,068 | B2 * | 3/2021 | Nevison | G05B 15/02 |
| 11,103,096 | B1 * | 8/2021 | Parr | A47G 29/1225 |
| 11,128,840 | B1 * | 9/2021 | Carter | G08B 13/19639 |
| 11,172,776 | B1 * | 11/2021 | Logan | G08B 13/14 |
| 11,463,662 | B2 * | 10/2022 | Licamara | H04N 7/186 |
| 11,812,878 | B1 * | 11/2023 | Nevison | H04L 9/0643 |
| 12,236,774 | B2 * | 2/2025 | Scalisi | H04L 12/12 |
| 12,262,831 | B2 * | 4/2025 | Crawford | A47G 29/30 |
| 12,266,250 | B2 * | 4/2025 | Williams | G08B 13/22 |
| D1,078,825 | S * | 6/2025 | Cooney | D16/214 |
| 12,582,254 | B2 * | 3/2026 | Sundaresan | A47G 29/141 |
| 2002/0035857 | A1 | 3/2002 | Stein et al. | |
| 2002/0087375 | A1 | 7/2002 | Griffin et al. | |
| 2003/0006275 | A1 | 1/2003 | Gray | |
| 2004/0080414 | A1 | 4/2004 | Darty | |
| 2004/0133304 | A1 | 7/2004 | Fobbe et al. | |
| 2005/0104730 | A1 | 5/2005 | Yang | |
| 2006/0179724 | A1 | 8/2006 | Lee | |
| 2007/0025712 | A1 * | 2/2007 | Jezierski | H04N 23/651 348/E5.042 |
| 2009/0166403 | A1 | 7/2009 | Volpe et al. | |
| 2015/0016665 | A1 * | 1/2015 | Tanner | G08B 13/1436 382/101 |
| 2016/0278558 | A1 * | 9/2016 | Ansari | A47G 29/121 |
| 2017/0007058 | A1 * | 1/2017 | Nuckols | A47G 29/12 |
| 2017/0124510 | A1 | 5/2017 | Caterino et al. | |
| 2017/0147975 | A1 | 5/2017 | Natarajan et al. | |
| 2017/0286905 | A1 | 10/2017 | Richardson et al. | |
| 2018/0070753 | A1 | 3/2018 | Eveloff et al. | |
| 2018/0225628 | A1 | 8/2018 | Roy | |
| 2018/0261030 | A1 * | 9/2018 | Arellano | G07C 9/33 |
| 2018/0352987 | A1 * | 12/2018 | Kutas | A47G 29/16 |
| 2018/0352988 | A1 * | 12/2018 | Ortiz | B64F 1/32 |
| 2019/0000255 | A1 | 1/2019 | Dehner et al. | |
| 2019/0167025 | A1 | 6/2019 | Cherry et al. | |
| 2019/0231106 | A1 | 8/2019 | Kaiserman et al. | |
| 2019/0300202 | A1 | 10/2019 | High et al. | |
| 2020/0077826 | A1 * | 3/2020 | Chenier | G07C 9/00912 |
| 2020/0107663 | A1 * | 4/2020 | Eivaz | A47G 29/141 |
| 2020/0128990 | A1 * | 4/2020 | Pate | B65G 51/26 |
| 2020/0351474 | A1 * | 11/2020 | Gaudiano Del Bosque | G08B 13/19695 |
| 2020/0383508 | A1 * | 12/2020 | Arif | A47G 29/20 |
| 2021/0045563 | A1 * | 2/2021 | Bartley-Clark | A47G 29/141 |
| 2022/0022678 | A1 * | 1/2022 | Horn | A47G 29/141 |
| 2022/0240704 | A1 * | 8/2022 | Castagno | A47G 29/1209 |
| 2022/0351592 | A1 * | 11/2022 | Cooney | G08B 5/36 |
| 2022/0398750 | A1 * | 12/2022 | Kerzner | G06V 10/62 |
| 2023/0218100 | A1 * | 7/2023 | Meyrowitz | A47G 29/16 340/569 |
| 2023/0320511 | A1 * | 10/2023 | Ferrara | A47G 29/16 232/39 |
| 2024/0197096 | A1 * | 6/2024 | Felder | A47G 29/141 |
| 2024/0344382 | A1 * | 10/2024 | Reyes | G07C 9/00896 |
| 2024/0374063 | A1 * | 11/2024 | Marlin | G08B 13/06 |
| 2024/0423405 | A1 * | 12/2024 | Meyrowitz | A61L 2/24 |
| 2025/0169636 | A1 * | 5/2025 | Butler | A47G 29/122 |
| 2025/0325131 | A1 * | 10/2025 | Butler | A47G 29/1214 |
| 2025/0331669 | A1 * | 10/2025 | Roane, III | A47G 29/141 |
| 2026/0047712 | A1 * | 2/2026 | Martinez | A47G 29/141 |
| 2026/0090670 | A1 * | 4/2026 | Mosley | A47G 29/141 |

* cited by examiner

SECURITY DEVICE FOR USE WITH A MAILBOX

RELATED APPLICATIONS

This application is a continuation-in-part of U.S. patent application Ser. No. 17/208,927, filed Mar. 22, 2021, which is a continuation-in-part of U.S. patent application Ser. No. 16/271,864, filed Feb. 10, 2019, which granted as U.S. Pat. No. 10,954,068 and claims priority from provisional application 62/628,989, filed Feb. 10, 2018. The disclosures of each of these applications are incorporated by reference in their entireties herein.

FIELD OF INVENTION

The disclosure relates generally to mailbox security devices. More specifically, the disclosure relates to a security device with a camera for installation on a mailbox, as well as a combination security system including a mailbox and a security device as a manufactured entity.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

According to an embodiment of the current disclosure, the invention includes a security device for installing on a mailbox, the security device comprising a housing configured to mount to the mailbox via one or more attachment mechanisms; a camera supported by the housing; a power system at least partially housed within the housing and configured to provide power to the camera; and a processing system at least partially housed within the housing and configured to operate the camera. The processing system including a processing unit configured to implement one or more actions, the one or more actions including a first action, the first action defined as an activation of the camera to begin recording within a pre-set geographic region of the mailbox; wherein the first action is implemented based on one or more triggers.

According to another embodiment of the current disclosure, the invention includes a security system, comprising a mailbox having a box body forming an interior cavity configured to receive mail and packages therein, the box body having a top surface, and a door attached to the box body and configured to provide access to the interior cavity. The security system further comprising a security device, having a housing mounted to the mailbox via one or more attachment mechanisms; a camera supported by the housing; a power system at least partially housed within the housing and configured to provide power to the camera; and a processing system at least partially housed within the housing and configured to operate the camera. The processing system including a processing unit configured to implement one or more actions, the one or more actions including a first action, the first action defined as an activation of the camera to begin recording within a pre-set geographic region of the mailbox, wherein the first action is implemented based on one or more triggers.

According to yet another embodiment of the current disclosure, the invention includes a method of monitoring a property within proximity to a mailbox, the method comprising providing a security system including a mailbox having a box body forming an interior cavity configured to receive mail and packages therein, the box body having a top surface; and a security device having a housing mounted to the top surface of the mailbox, a camera supported by the housing, a power system at least partially housed within the housing to power the camera, and a processing system at least partially housed within the housing. Next, monitoring a pre-set geographic region around the mailbox via the security device, the monitoring being accomplished by the camera(s) and/or motion sensor(s) as part of the security device, the camera(s) and the motion sensor(s) providing data to the processing system. Then, detecting a trigger via the processing system. Further, activating a first action due to the detecting of the trigger, the first action defined as an activation of the camera to begin recording within the pre-set geographic region of the mailbox, the recording creating a dataset, and transmitting the dataset to one or more of a wireless server and a user device.

BRIEF DESCRIPTION OF THE DRAWINGS

Embodiments of the invention are described in detail below with reference to the attached drawings.

The drawings do not limit the invention to the specific embodiments disclosed and described herein. The drawings are not necessarily to scale, emphasis instead being placed upon clearly illustrating various principles of the disclosure.

DETAILED DESCRIPTION

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Security systems and devices are well known in the art and aid individuals and entities in protecting and monitoring their property. For example, security cameras are commonly installed at a residential front door, wherein the camera monitors the area in front of the door, such as for package deliveries, package theft, and for home invasions. These cameras are limited in the area that they monitor and accordingly leave room for potential security breaches. Specifically, it is common for a home mailbox to be positioned at a street edge, which is commonly too far away from a door/house mounted camera to for proper monitoring. This can leave the mailbox open for potential theft. Yet further, it is common for a perimeter of a home to include bends and corners, such that again, a front door mounted camera is limited in its ability to adequately monitor the entire front edge/perimeter of a home or building.

Accordingly, the present invention provides for a security device and a security system that specifically includes a camera mounted on a mailbox and provides for monitoring of a pre-set geographic region from a viewpoint of the mailbox. Such positioning allows for better monitoring of the front edge of a home, as well as around the mailbox and into the street, which can aid in deterring theft at the mailbox, and provide a user with appropriate monitoring at the mailbox.

Figure 1:
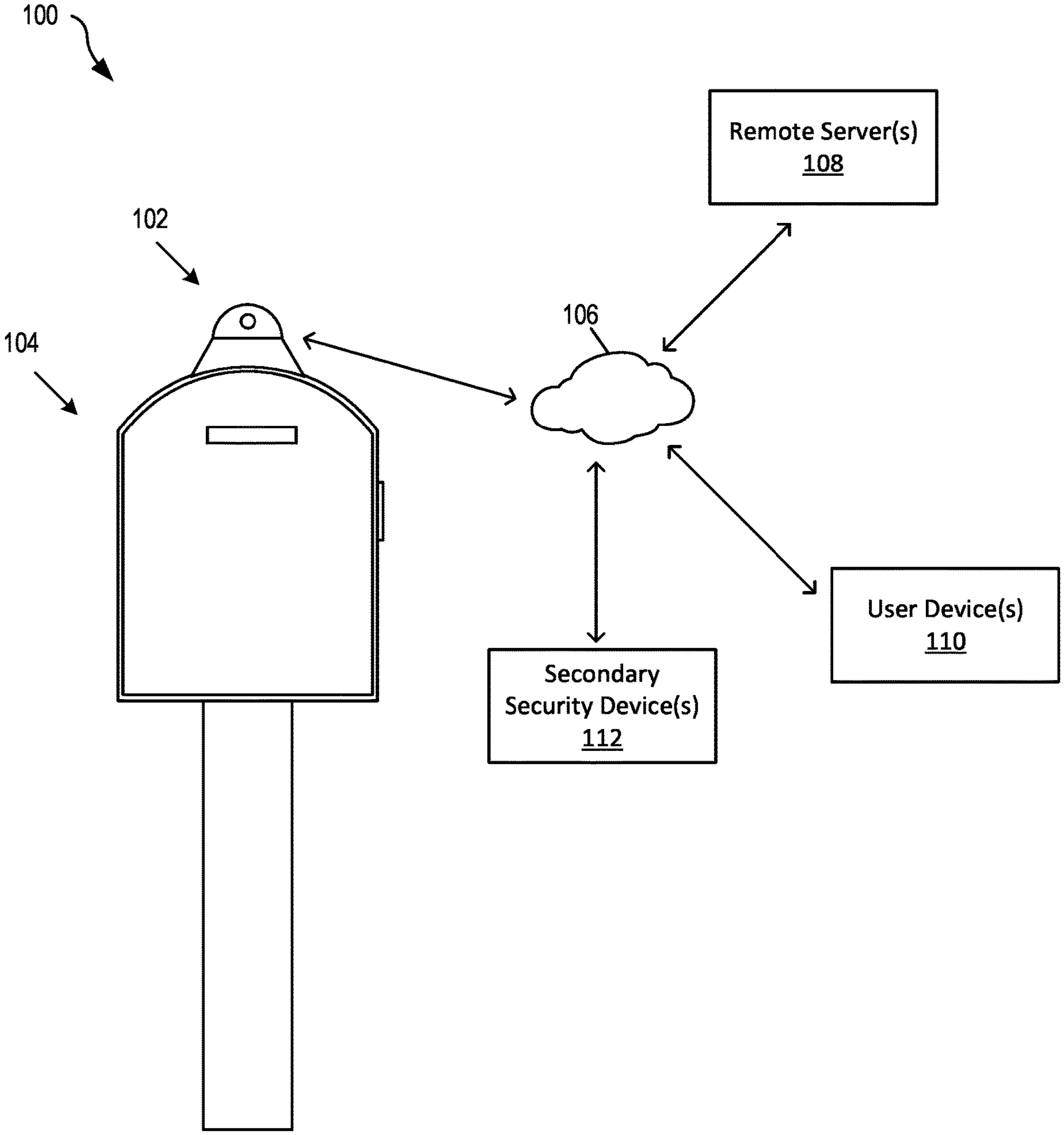
FIG. 1 is a schematic of a security system in accordance with the present application.
Figure 3:
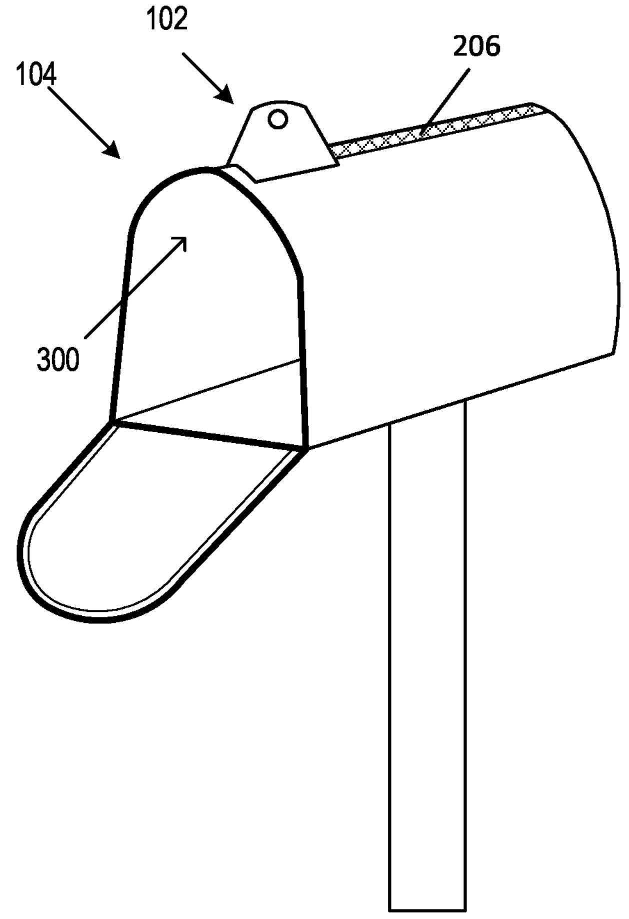
FIG. 3 is a perspective view of the mailbox and security device as part of the security system of FIG. 1.

FIG. 1 depicts a schematic of a security system 100 having a security device 102 mounted to a mailbox 104. Those skilled in the art will appreciate that the mailbox 104 may vary, but in at least some embodiments, the mailbox 104 is a conventional mailbox configured to be mounted on a post or similar vertical support structure and positioned near a street outside of a user's residence. Accordingly, the mailbox 104 may vary in aesthetics or features, but should include a mailbox body 202 with a top surface 200 and a door 208 configured to provide access to an interior cavity 300. The interior cavity 300 is configured to receive packages therein, as shown best in FIG. 3. The mailbox 104 can include additional aesthetic features and functional elements, such as a flag 204 as is common in a traditional mailbox.

The security device 102 of system 100 is specifically configured to mount onto the top surface 200 of the mailbox 104. The security device 102 may be manufactured into the mailbox 104 or may be manufactured separately and mounted aftermarket. In other words, an end user may purchase a mailbox with the security device built in, or may purchase the security device as an independent entity and add it to their pre-existing mailbox. The security device 102 is specifically configured to monitor the area around the mailbox 104 and accordingly allows for improved monitoring of such area.

As shown in FIG. 1, the security device 102 includes hardware and software that allows for the security device 102 to communicate through a network 106 with one or more of: (1) wireless server(s) 108, (2) user device(s) 110, and (3) secondary security device(s) 112. For example, the user device(s) 110 may include phones, tablets, computers, personal assistant home devices, or any other user device with associated technology to facilitate communication. The secondary security device(s) 112 may include additional security cameras, secondary motion sensors, alarms, internet of things devices, or other devices capable of wireless communication with the security device 102.

Figure 2:
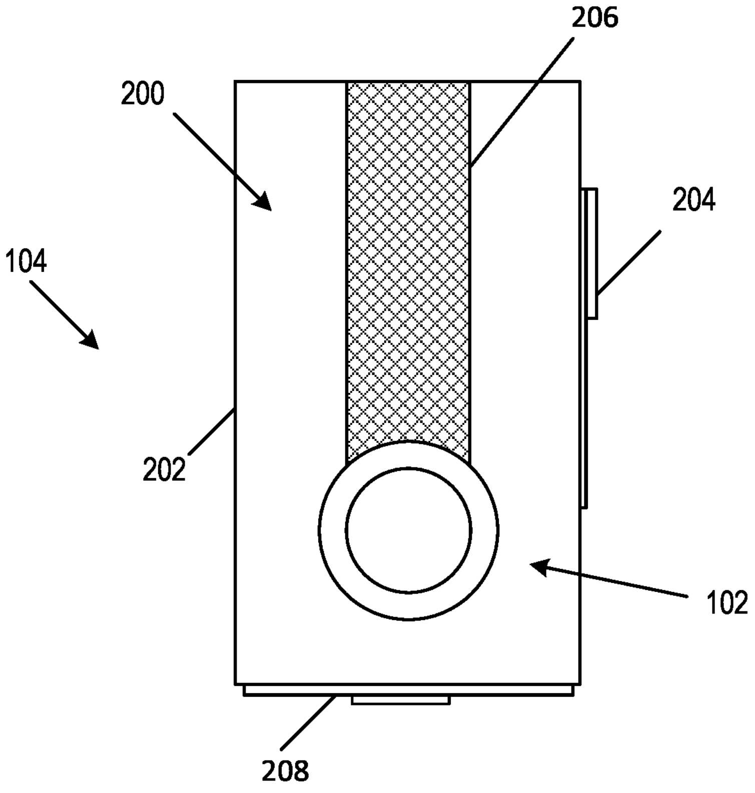
FIG. 2 is a top view of a mailbox and security device as part of the security system of FIG. 1.

As best shown in FIG. 2, the security device 102 is mounted to the top surface 200 of the mailbox 104. The security device 102 may be permanently mounted, or removably mounted, by any mechanism known by those skilled in the art, such as bolts, screws, adhesives, magnets, or any combination thereof. In embodiments, the security device 102 includes a solar strip 206 mounted to the top surface 200, the solar strip 206 providing power to an internal battery of the security device 102. Again, the solar strip 206 may be mounted by any means understood by those skilled in the art, such as adhesives, bolts, screws, or the like.

Figure 4:
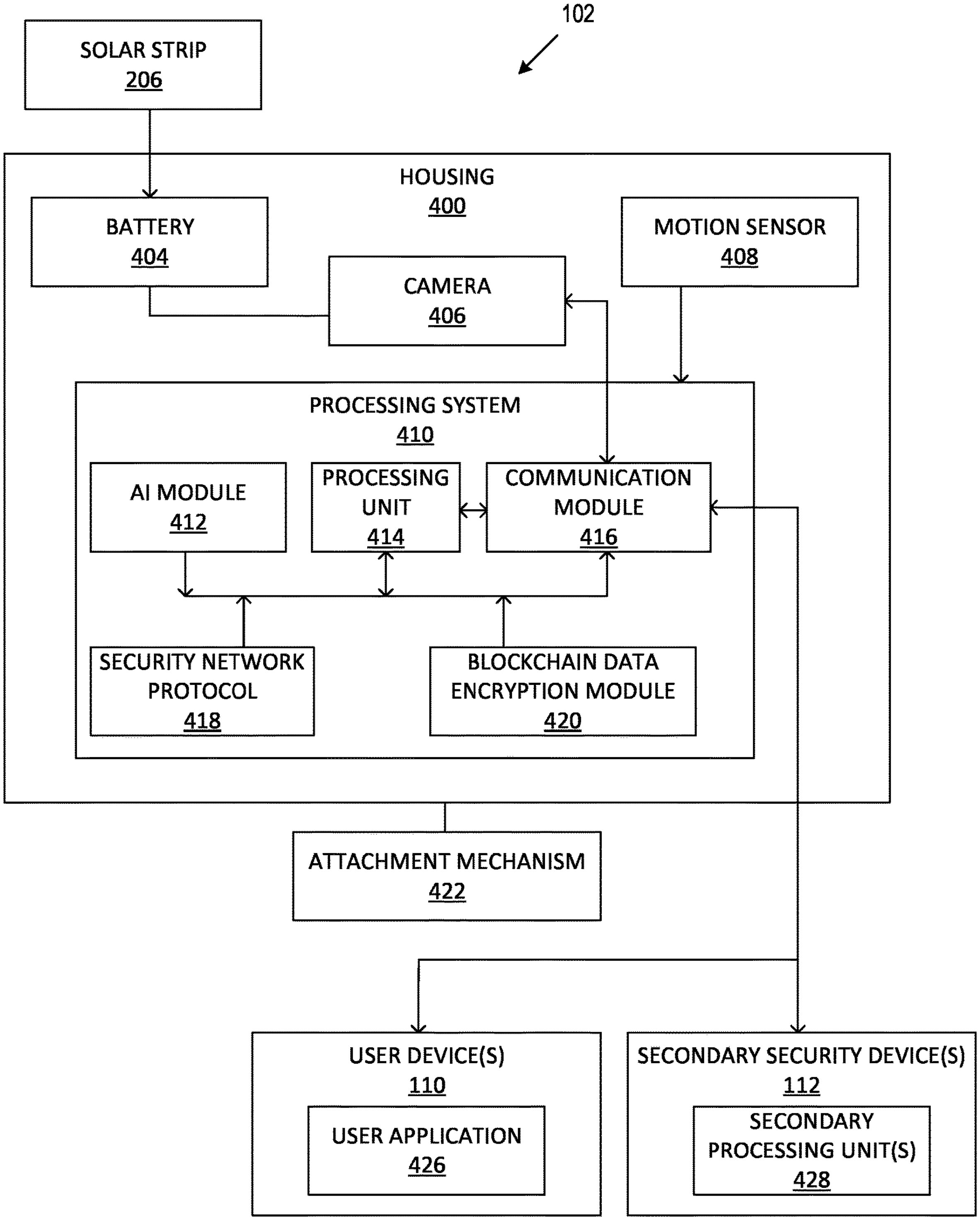
FIG. 4 is a block diagram of the security device of FIG. 1.

In FIG. 4, a block diagram depicts the security device 102. The security device 102 includes a housing 400 for housing necessary hardware and software components. A camera 406 is supported by the housing 400, the camera 406 specifically supported in such a way that allows for 360 degrees of rotation, and accordingly the camera 406 can have a wide range of view around the mailbox 104. The camera 406 can vary as would be understood by those skilled in the art, however, in some embodiments, the camera 406 is a high-definition video capture capable camera with high definition video recording, night vision, and low-light recording capabilities. A battery 404 within the housing 400 is in power transmission with the solar strip 206, such that the battery 404 can continuously recharge and provide power to the various components of the security device 102, such as the camera 406.

A processing system 410 is at least partially housed within the housing 400 and is configured to operate the camera 406. In embodiments, the processing system 410 is only partially housed within the housing 400, and external components, such as a user computer, phone, or server, may provide and function as part of the processing system 410. The processing system 410 includes a processing unit 414, such as a processor, board, or the like, the processing unit 414 configured to implement actions and commands based on information received and processed. In other words, the processing unit 414 is any unit capable of providing the technologies discussed herein and should not be limited to known technology.

A communication module 416 as part of the processing system 410 operates to facilitate communication between various internal and external components. For example, the communication module 416 may utilize wired or wireless technologies to facilitate communication between the processing unit 414 and the camera 406, such that the processing unit 414 can transmit commands to the camera 406 and receive data back from the camera 406. In addition, the communication module 416 facilitates communication between other components of the processing system 410, as well as between the processing system 410 and the user device(s) 110, secondary security device(s) 112, and the external server(s) 108. Such communication may be achieved via wi-fi, cellular, Bluetooth, or similar technologies that allow for the wireless transmission of information.

In some embodiments, the processing system 410 includes an artificial intelligence (AI) module 412, which can function with the processing unit 414 and the camera 406 to provide image recognition technology. For example, the AI module 412 and camera 406 can provide recognition of a person within the pre-set geographic region, such that a trigger is sent to the processing unit 414 to activate recording via the camera 406. The use of image recognition technology via the AI module 412 aids in recording only relevant events, as opposed to recording constantly or at every movement.

The processing system 410 can further include a blockchain data encryption module 420 to operate with the processing unit 414 to encrypt data before transmission of the data. For example, as the camera 406 records, a dataset is created, which can then be encrypted with blockchain technology before being transmitted to a remote server or a user device. It should be appreciated that said transmission and encryption can happen substantially simultaneously as recording.

Yet further, the processing system 410 can include a security network protocol 418 that functions to facilitate connection with the one or more secondary security devices 112. For example, the security network protocol 418 can allow for the security device 102 to become part of an internet of things, which allows for the processing unit 414 to receive triggers from one or more of the secondary security devices 112 and activate recording of the camera 406. As an example, a secondary security device 112 may detect movement, such that a secondary processing unit 428 communicates said movement back to the processing unit 414, which uses the movement as a trigger to begin activation of the camera 406. As another example, one of the secondary security devices 112 may be a home alarm system, such that if the home alarm system is triggered, the camera 406 will begin recording. As yet another example, one of the secondary security devices 112 may be a garage opener, such that if the garage opener is activated, the camera 406 begins recording. These are merely examples and should not be considered limiting to the present disclosure.

Similarly, a user application 426 as part of the user device(s) 110 can provide for remote control of the camera 406 from the user device. For example, a user may activate the camera remotely at their discretion. The user application 426 can further provide for user monitoring remotely, as the processing unit transmits the dataset to the user device 110.

In embodiments, the security device 102 includes a motion sensor 408 which may be housed within or on the housing 400, or may be separate and in electronic communication with the processing system 410. The motion sensor 408 is configured to transmit motion data to the processing system 410 such that the motion data can be used by the processing unit 414 as a trigger for activation of the camera 406.

As discussed, an attachment mechanism 422 is used to secure the housing 400 to the top surface 200 of the mailbox 104, the attachment mechanism 422 being any appropriate attachment mechanism as understood by those skilled in the art.

Figure 5:
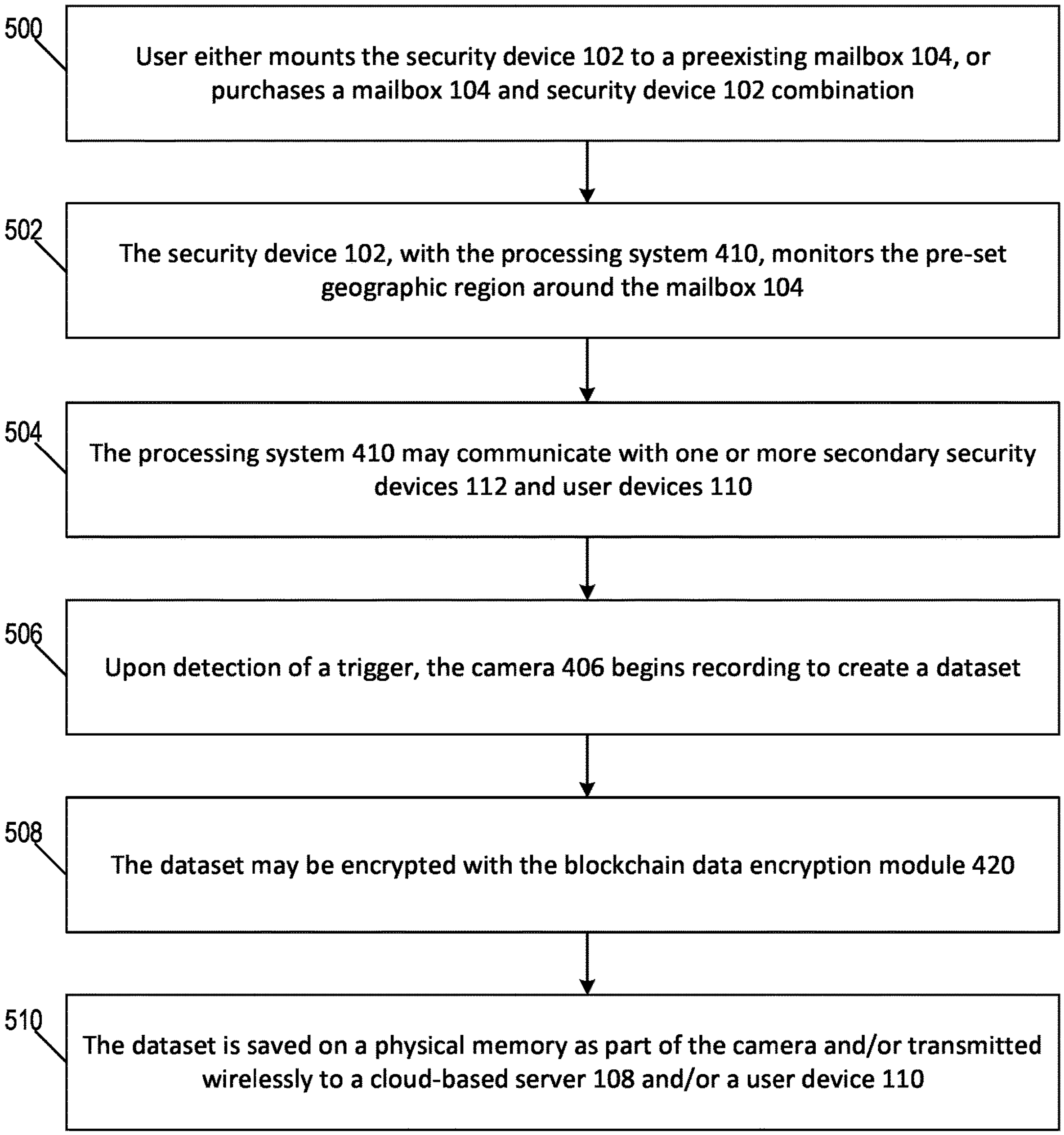
FIG. 5 is a flowchart of a method of use of the security system of FIG. 1.

In FIG. 5, a flowchart depicts a method associated with the system of FIG. 1. At step 500, the user will either mount the security device 102 to a preexisting mailbox after market or will purchase the mailbox 104 and security device 102 as a combination manufactured unit. The mailbox 104 and security device 102 are ultimately installed a user desired location, but preferably at a roadside location as is common with residential mailboxes.

At step 502, the security device 102 with the processing system 410 will begin monitoring a pre-set geographic region around the mailbox 104. Specifically, the security device 102 monitors the area around the mailbox 104, which in at least some embodiments, is specifically positioned at roadside in front of a residence. This distinction of position is important, as the security device 102 of the present invention is specifically configured to monitor away from the front door of the residence or even away from the residence itself. This allows for a user to have improved security monitoring of their entire property, as well as for package receiving.

At step 504, as part of monitoring the geographic region, the processing system 410 may communicate with one or more secondary security devices 112, one or more user devices 110, and one or more remote servers 108, such that triggers/commands may be implemented through said devices.

At step 506, upon detection of a pre-established trigger, the camera 406 begins recording to create a dataset. The pre-established trigger may be one from the group: (1) a user command sent from a user device; (2) detection of movement by the motion sensor 408; (3) detection of movement by the motion sensor 408 as well as image recognition of the element that cause the movement by the artificial intelligence module 412; and (4) a detection of a trigger from one of the secondary security devices 112.

Examples of triggers from secondary security devices include: (1) detection of a garage door opening; (2) detection of an alarm at a building being activated; and (3) detection of a doorbell ring. Again, in this respect, the security device 102 functions with an internet of things to provide inclusive security monitoring and communication between a plurality of devices.

At steps 508 and 510, as or after the dataset is created, it may be encrypted using the blockchain data encryption module 420 before being transmitted away from the security device 102, such as to the user device 110 or remote server 108, or saved to a memory of the security device 102. It should be appreciated that the dataset may be directly live streamed, as opposed to being first created, saved, and then transmitted.

Figure 6:
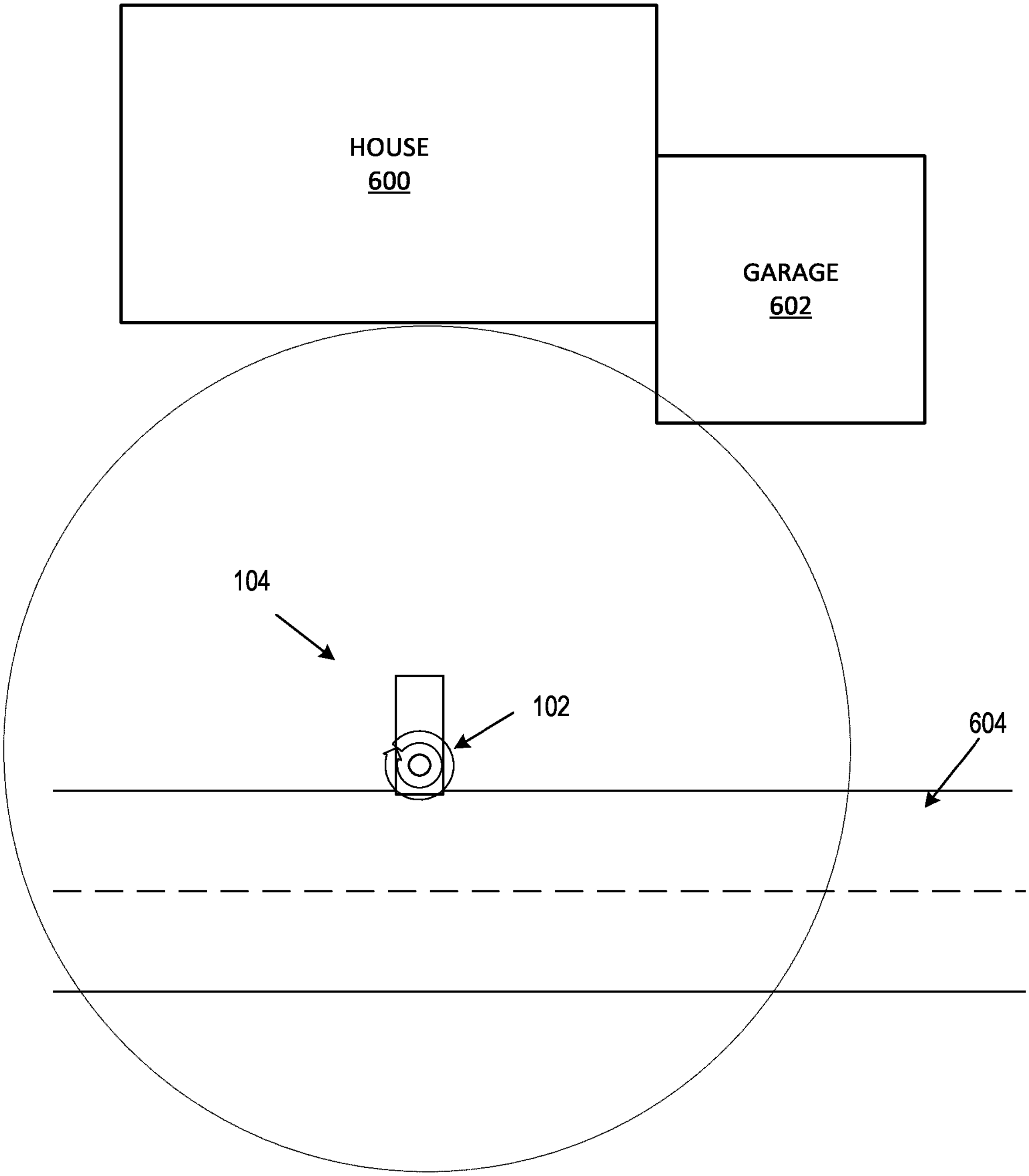
FIG. 6 is a first example of a pre-set geographic region as monitored by the security system of FIG. 1.
Figure 7:
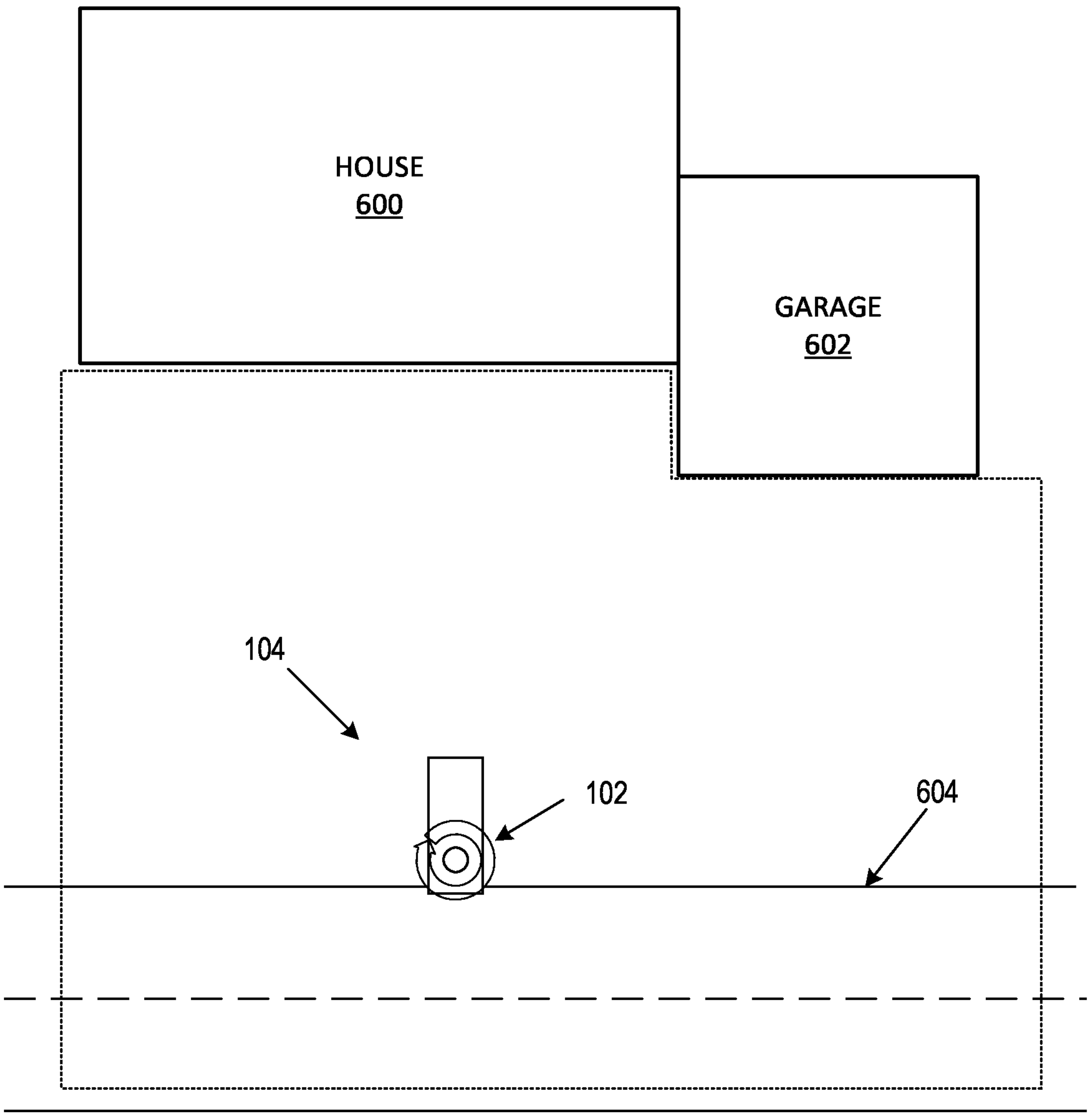
FIG. 7 is a second example of a pre-set geographic region as monitored by the security system of FIG. 1.

In FIGS. 6 and 7, two examples of the positioning of the security device 102 and mailbox 104 are shown. As further shown, the security device 102 is capable of 360 degrees of rotation and monitoring, as represented via the arrow. In FIG. 6, the security device 102 and mailbox 104 are positioned at a street 604 as is conventional. In this embodiment, the security device 102 is configured to monitor within a pre-set radius extending away from the security device 102. This radius may be set by a user or manufacturer, such as through initial settings or settings implemented through the user device and application and may be set at a specific distance such as for privacy reasons, or may merely be the distance that the camera 406 is capable of monitoring due to hardware or software limitations. Accordingly, as shown, the security device 102 is specifically configured for monitoring a majority of an area in front of a residential house 600 and/or garage 602. In FIG. 7, the security device 102 and mailbox 104 are again positioned at the street 604 as is conventional, however, in this embodiment, a specific geographic regions in front of the house 600 and garage 602 is established, such as through geofencing technology. In embodiments allowing for setting of a particular geographic region, such as through geofencing or other technologies, allows for privacy considerations. For example, it may be desirable that the view-point/monitoring of the camera 406 does not extend past an owner's property line and into a neighbor property for privacy considerations. Such settings may be preset or established through the user device(s) 110 and user application 426.

The security device 102 of the present invention provides for improved home/building monitoring by being specifically mounted at the right location, namely on a mailbox near a street. This location reduces the existence of blind spots for improved security and maintains the inconspicuous nature of the device from being part of a mailbox.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and sub-combinations are of utility and may be employed without reference to other features and sub-combinations. Not all steps listed in the various figures need be carried out in the specific order described.

The invention claimed is:

1. A security device for installing on a mailbox, the security device comprising:
- a housing configured to mount to a top exterior surface of the mailbox via one or more attachment devices;
- a camera supported by the housing such that the camera is positioned exterior of the mailbox;
- a power system at least partially housed within the housing and configured to provide power to the camera; and
- a processing system at least partially housed within the housing and configured to operate the camera, the processing system including:
  - a processing unit configured to implement one or more actions, the one or more actions including a first action, the first action defined as an activation of the camera to begin recording within a pre-set geographic region of the mailbox, the pre-set geographic region being defined as having a center location that is defined by a location of the camera and a perimeter that forms a boundary of the pre-set geographic region for which the camera is configured to record, the center location being positioned adjacent to a roadside in front of a residence, the pre-set geographic region including area in front of the mailbox and area behind the mailbox, wherein the first action is implemented based on one or more triggers;

a security network protocol configured to connect the processing system with one or more secondary security devices such that the processing system communicates with one or more secondary processing units as part of the one or more secondary security devices;

the one or more secondary security devices including at least one device selected from a group consisting of:
- a home alarm system, wherein a first trigger of the one or more triggers is activated when the home alarm system is activated;
- a garage opener, wherein a second trigger of the one or more triggers is activated when the garage opener is activated; and
- a doorbell, wherein a third trigger of the one or more triggers is activated when the doorbell is activated;

wherein the processing unit is configured to implement the first action based on the first trigger, the second trigger, or the third trigger as received from the one or more secondary processing units.

2. The security device of claim 1, wherein the camera is configured with 360 degrees of rotation as supported by the housing.

3. The security device of claim 1, wherein the one or more triggers further comprises at least one of the following:
- a user implemented command transmitted from a user device to the processing system; and
- a motion activated command as determined by a motion sensor, the motion sensor supported by the housing.

4. The security device of claim 1, wherein the power system further comprises:
- an internal battery housed within the housing; and
- a solar strip configured to mount to the top exterior surface of the mailbox and in power transmission with the internal battery.

5. The security device of claim 1, wherein the processing system further comprises:
- a communications module configured to facilitate wireless communication between the processing unit and at least one of a user device and a cloud-based server, wherein the communications module facilitates a transfer of a dataset as captured by the camera to the at least one of the user device and the cloud-based server.

6. The security device of claim 1, wherein the processing system further comprises an artificial intelligence module configured to operate with the camera to provide image recognition capabilities, the artificial intelligence module configured to recognize a person such that said recognition activates a trigger of the one or more triggers to implement the first action.

7. The security device of claim 1, wherein the processing system further comprises a blockchain data encryption module configured to encrypt data collected by the camera.

8. The security device of claim 1, wherein the perimeter of the pre-set geographic region is defined by a radius away from the center location, the radius being pre-set.

9. A security system, comprising;
- a mailbox having:
  - a box body extending from a front end to a back end and from a top to a bottom, the box body further forming an interior cavity configured to receive mail and packages therein, the box body having a top exterior surface that extends from the front end to the back end; and
  - a door attached to the box body and configured to provide access to the interior cavity;
- a security device, having:
  - a housing mounted to the top exterior surface of the mailbox via one or more attachment mechanisms;
  - a camera supported by the housing such that the camera is positioned exterior of the mailbox;
  - a power system at least partially housed within the housing and configured to provide power to the camera; and
  - a processing system at least partially housed within the housing and configured to operate the camera, the processing system including:
    - a processing unit configured to implement one or more actions, the one or more actions including a first action, the first action defined as an activation of the camera to begin recording within a pre-set geographic region of the mailbox, the pre-set geographic region is defined by a center location that is defined by a location of the camera and a perimeter that forms a boundary of the pre-set geographic region for which the camera is configured to record, the center location being positioned adjacent to a roadside in front of a residence, the pre-set geographic region including area in front of the mailbox and area behind the mailbox, wherein the first action is implemented based on one or more triggers; and
- a security network protocol configured to connect the processing system with one or more secondary security devices such that the processing system communicates with one or more secondary processing units as part of the one or more secondary security devices;
- the one or more secondary security devices including at least one device selected from a group consisting of:

a home alarm system, wherein a first trigger of the one or more triggers is activated when the home alarm system is activated;

a garage opener, wherein a second trigger of the one or more triggers is activated when the garage opener is activated; and a doorbell, wherein a third trigger of the one or more triggers is activated when the doorbell is activated;

wherein the processing unit is configured to implement the first action based on the first trigger, the second trigger, or the third trigger as received from the one or more secondary processing units.

10. The security system of claim 9, wherein the camera is configured with 360 degrees of rotation as supported by the housing.

11. The security system of claim 9, wherein the one or more triggers further comprises at least one of the following:

a user implemented command transmitted from a user device to the processing system; and a motion activated command as determined by a motion sensor, the motion sensor supported by the housing.

12. The security system of claim 9, wherein the power system further comprises:

an internal battery housed within the housing; and a solar strip mounted to the top exterior surface of the mailbox and in power transmission with the internal battery.

13. The security system of claim 9, wherein the processing system further comprises:

a communications module configured to facilitate wireless communication between the processing unit and at least one of a user device and a cloud-based server, wherein the communications module facilitates transfer of one or more video captures to the at least one of the user device and the cloud-based server.

14. The security system of claim 9, wherein the processing system further comprises an artificial intelligence module configured to operate with the camera to provide image recognition capabilities, the artificial intelligence module configured to recognize a person such that said recognition activates a trigger of the one or more triggers to implement the first action.

15. The security system of claim 9, wherein the processing system further comprises a blockchain data encryption module configured to encrypt data collected by the camera.

16. The security system of claim 9, wherein the perimeter of the pre-set geographic region is defined by a radius away from the center location, the radius being pre-set.

17. The security system of claim 9, wherein the perimeter of the pre-set geographic region is defined using geofencing technology such that the perimeter aligns with at least a portion of a property line of the residence.

* * * * *